US010206334B2

(12) United States Patent
Hendricks

(10) Patent No.: US 10,206,334 B2
(45) Date of Patent: Feb. 19, 2019

(54) DEVICE FOR PROTECTIVELY ATTACHING A DECORATIVE ITEM TO A SUPPORT AND ASSOCIATED METHODS

(71) Applicant: Shining Sea Trading Company, West Valley City, UT (US)

(72) Inventor: Jared Hendricks, Draper, UT (US)

(73) Assignee: Shining Sea Trading Company, West Valley, UT (US)

(*) Notice: Subject to any disclaimer, the term of this patent is extended or adjusted under 35 U.S.C. 154(b) by 64 days.

(21) Appl. No.: 15/144,748

(22) Filed: May 2, 2016

(65) Prior Publication Data

US 2017/0023173 A1 Jan. 26, 2017

Related U.S. Application Data

(60) Provisional application No. 62/156,110, filed on May 1, 2015.

(51) Int. Cl.
| | | |
|---|---|---|
| *A01G 5/04* | (2006.01) |
| *F16M 13/02* | (2006.01) |
| *F16B 2/08* | (2006.01) |
| *A47F 5/08* | (2006.01) |
| *A47G 33/10* | (2006.01) |
| *A47G 33/00* | (2006.01) |

(52) U.S. Cl.
CPC .............. *A01G 5/04* (2013.01); *A47F 5/0838* (2013.01); *A47G 33/00* (2013.01); *A47G 33/10* (2013.01); *F16B 2/08* (2013.01); *F16M 13/022* (2013.01)

(58) Field of Classification Search
CPC ....... A47G 33/00; A47G 33/10; A47F 5/0838; A01G 5/04

USPC ................... 248/227.4; 428/99, 100
See application file for complete search history.

(56) References Cited

U.S. PATENT DOCUMENTS

| | | | | |
|---|---|---|---|---|
| 1,747,892 A | * | 2/1930 | Fisher ..................... | A47G 33/10 24/372 |
| 1,747,893 A | * | 2/1930 | Fisher ..................... | A47G 33/10 24/370 |
| 3,401,857 A | * | 9/1968 | Wilson .................... | A01K 65/00 224/250 |
| 3,871,084 A | * | 3/1975 | Carrington ............. | A22B 5/161 452/128 |
| 5,577,698 A | * | 11/1996 | Liu .......................... | F16B 2/08 24/16 PB |
| 5,582,337 A | * | 12/1996 | McPherson ............... | A45F 3/14 224/660 |
| 6,143,392 A | * | 11/2000 | Hughes ............... | B05B 15/0456 118/505 |
| 2002/0160128 A1 | * | 10/2002 | Ciccarello ............. | A47G 33/10 428/11 |
| 2002/0162494 A1 | * | 11/2002 | Skulnick ................. | B63B 59/02 114/219 |

(Continued)

FOREIGN PATENT DOCUMENTS

DE             513961 C   * 12/1930 ............. A47G 33/10

*Primary Examiner* — Eret C McNichols
(74) *Attorney, Agent, or Firm* — Thorpe North & Western, LLP

(57) ABSTRACT

A substrate protection device for attaching a decorative item to a rail-type structure is disclosed and described. Such a substrate protection device couples a decorative item to a rail-type structure in a manner that provides protection against damage to the rail-type structure from the decorative item.

9 Claims, 5 Drawing Sheets

(56) References Cited

U.S. PATENT DOCUMENTS

| | | | | |
|---|---|---|---|---|
| 2003/0096066 A1* | 5/2003 | Clark | ............... | D04D 7/10 |
| | | | | 428/4 |
| 2004/0129846 A1* | 7/2004 | Adams | ............... | F21V 21/088 |
| | | | | 248/231.81 |
| 2004/0140408 A1* | 7/2004 | Jackson | ............... | A47G 33/10 |
| | | | | 248/215 |
| 2004/0150196 A1* | 8/2004 | Henderson | ............... | B60R 21/213 |
| | | | | 280/728.2 |
| 2004/0188032 A1* | 9/2004 | Jackson | ............... | A47F 5/0838 |
| | | | | 156/574 |
| 2007/0209165 A1* | 9/2007 | Sorensen | ............... | B60P 7/0823 |
| | | | | 24/130 |
| 2009/0302287 A1* | 12/2009 | Langan | ............... | E04F 11/1842 |
| | | | | 256/1 |
| 2010/0251592 A1* | 10/2010 | Otto | ............... | F41C 23/18 |
| | | | | 42/94 |
| 2013/0026316 A1* | 1/2013 | Case | ............... | B62J 11/00 |
| | | | | 248/205.1 |
| 2014/0287168 A1* | 9/2014 | Harman | ............... | A47G 33/08 |
| | | | | 428/7 |
| 2015/0173465 A1* | 6/2015 | Messner | ............... | A47B 23/04 |
| | | | | 248/205.4 |
| 2017/0367499 A1* | 12/2017 | Waters | ............... | A47D 15/008 |
| 2018/0131169 A1* | 5/2018 | Vilhelmsen | ............... | H02G 3/305 |

\* cited by examiner

DEVICE FOR PROTECTIVELY ATTACHING A DECORATIVE ITEM TO A SUPPORT AND ASSOCIATED METHODS

PRIORITY DATA

This application claims the benefit of U.S. Provisional Patent Application Ser. No. 62/156,110, filed on May 1, 2015, which is incorporated herein by reference in its entirety.

BACKGROUND

Using decorative items in home, business, public, or other settings, has become increasingly popular as a way of increasing the spirit and well-being of many of those viewing the decorative items. Such decorations can be for religious, holiday, celebratory, or other reasons, including for conveying information, advertising, or other message material.

BRIEF DESCRIPTION OF THE DRAWINGS

For a fuller understanding of the nature and advantage of the present invention, reference is being made to the following detailed description of embodiments, and in connection with the accompanying drawings, in which.

DETAILED DESCRIPTION

Figure 1:
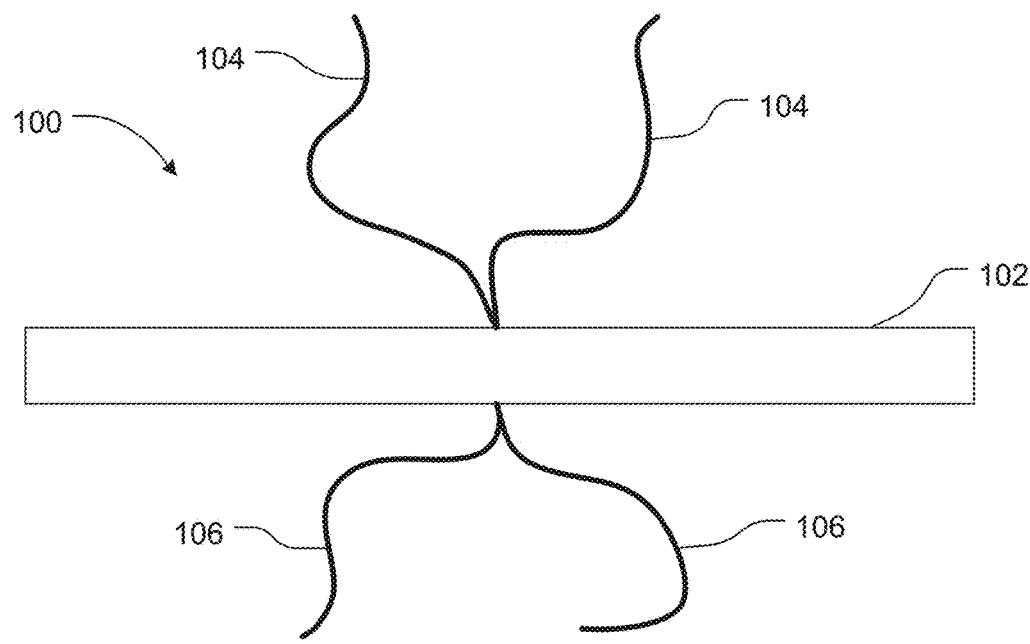
FIG. 1 is a schematic drawing of a substrate protection device in accordance with one aspect of the present disclosure.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

The following terminology will be used in accordance with the definitions set forth below.

As used herein, the term "about" is used to provide flexibility to a numerical range endpoint by providing that a given value may be "a little above" or "a little below" the endpoint.

As used herein, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly, and vice versa.

A "rail-type structure" can be of a variety of sizes and shapes, including, but not limited to, square, rectangular, circular, triangular, polygonal, diamond, octagonal, and the like. The rail-type structure can be oriented vertically, horizontally, diagonally, and can be linear, semi-circular, circular, a spiral, and the like. Exemplary rail-type structures can include, hand rails, stair railing, banisters, flag poles, fence poles, posts, coat rack stands, hanging lights with linear structures, light poles, archways, arbors, gazebos, pergolas, and artistic sculptures.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described. The above is true of groups contained both in the specification and claims of this application. Additionally, no individual member of a group should be construed as a de facto equivalent of any other member of the same group solely based on their presentation in a common group without indications to the contrary.

The Disclosure

The present disclosure provides a substrate protection device and methods for protecting a rail-type structure from an attached decorative item. In some cases, such a substrate protection device can be structurally configured to provide a securing mechanism for the decorative item. In other cases, the substrate protection device can be of an aesthetically pleasing design that primarily serves to support the decorative item on the rail-type structure while protecting the rail-type structure from decorative item-related damage. In some cases, the substrate protection device provides decorative features that can be displayed in addition to the decorative item.

The substrate protection device can be utilized to attach a wide variety of decorative items to a wide variety of rail-type structures, and the present scope includes any decorative item and any rail-type structure whereby such attachment is feasible using the present substrate protection devices. In one non-limiting example, the substrate protection device can be utilized to attach a decorative item to a rail-type structure, while at the same time protecting the rail-type structure from damage by the decorative item.

Decorative items can include holiday and non-holiday decorations, as well temporary, semi-permanent, and permanent decorations. Specific non-limiting examples of such decorative items can include garlands, wreaths, holiday stockings, lights, strings of lights, beads, fabrics, flowers, bells, tulle, ribbon, paper decorations, and the like, including appropriate combinations thereof. A decorative item can be a single item such as a single light, or a collection of items such as a strand of electrically connected lights. Thus, in some cases a single substrate protection device can be utilized to attach a single decorative item, such as a single bell, to a rail-type structure. In other cases, multiple substrate protection devices can be utilized to attach an extended decorative item, such as a string of bells, to a rail-type structure. Additionally, in yet other cases, multiple substrate protection devices can be utilized to attach multiple discrete decorative items, such as a plurality of unattached bells, to a rail-type structure.

As has been described, a wide variety of rail-type structures are contemplated to which an object can be attached, and any of such structures are considered to be within the present scope. Rail-type structures can include stationary and non-stationary structures, and can include structures oriented in any physical direction from horizontal (parallel to the ground) to vertical (perpendicular to the ground) and any angle or orientation there between. A non-limiting example of a rail-type stationary supporting structures can include a protective barrier, such as various handrails, stair railing, banisters, gates, bars, flag poles, fence poles, posts, coat rack stands, hanging lights with linear structures, light poles, archways, arbors, gazebos, pergolas, artistic sculptures, and the like, including appropriate combinations thereof. For example, a decorative item such as garland can be attached along handrails and/or handrail supporting structures of a banister. It is noted that the term "banister" refers to a handrail including a plurality of supporting structures extending there from, and includes both structures associated with staircases and structures not associated with staircases.

In one example, a substrate protection device is presented herein. The substrate protection device can allow for the attachment of a decorative item to a rail-type substrate. In one example, the substrate protection device can include a protective substrate, a first securing mechanism, and a second securing mechanism. The protective substrate can be conformable to a rail-type structure. The first securing mechanism can be coupled to the protective substrate, and can be structurally configured to attach the protective substrate to the rail-type structure. The second securing mechanism can be coupled to the protective substrate and configured to attach to a decorative item to the protective substrate.

In one example, of a substrate protection device 100, is shown in FIG. 1. The substrate protection device can include a protective substrate 102, a first securing mechanism 104, and a second securing mechanism 106, where the first and second securing mechanisms are functionally coupled to the protective substrate 102. One of the securing mechanisms can be utilized to secure the protective substrate 102 to a decorative item, while the other securing mechanism can be used to secure the protective substrate to the rail-type substrate. In the case of FIG. 1, for example, the protective substrate 102 can be coupled to the rail-type structure by the first securing mechanism 104, and the second securing mechanism 106 can be used to couple the protective substrate 102 to the decorative item. The first securing mechanism 104, and the second securing mechanism 106, are shown in FIG. 1 on opposite sides of the protective substrate 102; however, alternative arrangements are contemplated.

Figure 2:
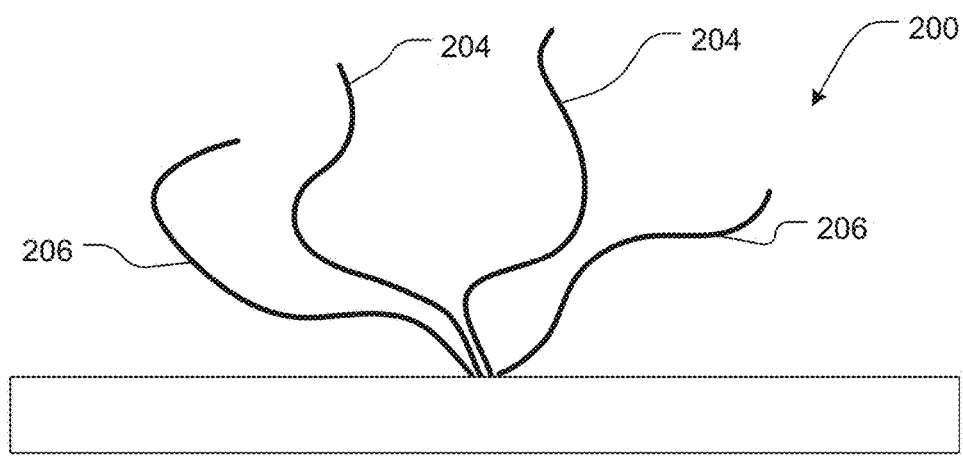
FIG. 2 is a schematic drawing of a substrate protection device in accordance with another aspect of the present disclosure.

In another example, the first securing mechanism and the second securing mechanism can be coupled to the protective substrate on one side of the protective substrate as shown in FIG. 2. In FIG.2, the substrate protection device 200 can have a first securing mechanism 204 and a second securing mechanism 206 coupled at the same side of a protective substrate 202. In the case whereby the rail-type structure is to be located on the opposite side of the protective substrate from the securing mechanisms, the act of attaching the first securing mechanism 204, to the rail-type supporting structure can fold or bend the protective substrate 202, to conform at least roughly to the supporting structure. In some cases, the protective substrate 202, can be wrapped at least partially around a portion of the rail-type supporting structure by the action of the first securing mechanism 204.

The protective substrate can be made of a variety of materials depending on factors such as designer preference, device design, aesthetics, cost, practicality, and the like. The protective substrate can include any material that can function to protect a rail-type structure from damage from a decorative item, or that can provide sufficient structure for the first and second securing mechanisms to be coupled to. In one example the protective substrate can include fabric, cloth, leather, felt, ribbon, batting, foam, rubber, plastic, vinyl, cardboard, carpet, paper, ceramic, polymeric materials, rope, metal, or the like, including combinations thereof. In one example, the protective substrate can be a fabric. In another example, the protective substrate can be a plastic. In yet another example, the protective substrate can be a polymeric material. In some examples, the protective substrate can be a cloth with a bias or edging. The edging can be a rope, bias tape, ribbon, cord, a wrapped wire, lace, beading, fringe, bells, any of the listed protective substrate materials, or a combination thereof.

In some examples, the protective substrate can include a single layer material, while in other embodiments, the protective substrate can include multiple layers of the same or different materials. In one example, the protective substrate can include two layers of material. A secondary layer can be used for a number of reasons, including to add protection to the protective substrate, to increase or decrease the friction between the protective substrate and the rail-type supporting structure, to enhance the aesthetic nature of the device, and the like, including various combined functionality. In another example, the protective substrate can comprise at least three layers with a top layer, a bottom layer, and an intermediate layer. The intermediate layer can include a padding layer, a fastening layer (e.g. magnets), a scented layer, a fire retardant layer, a water proofing layer, or the like, including combinations thereof. In yet another example, the protective substrate can include multiple layers of materials with a pocket. In one such example, the pocket can be used to insert scent sticks, scented beads, scented pouches, etc. In another example, the pocket can include a hidden hook or loop that allows for additional decorative items to be secured to the substrate protection device.

Figure 3:
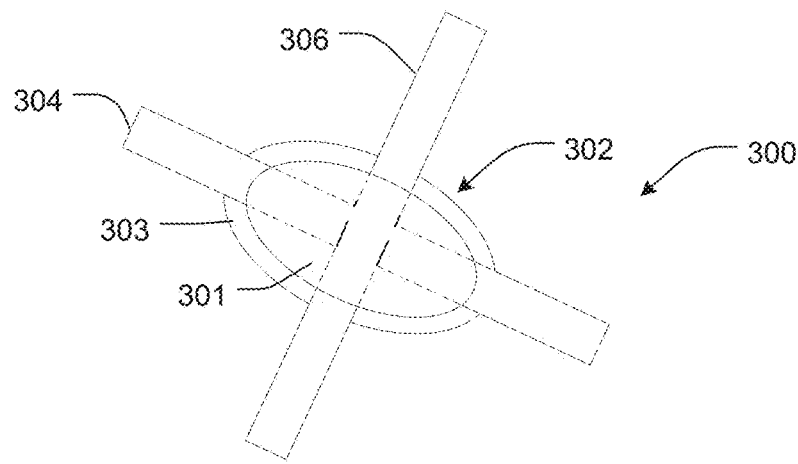
FIG. 3 is a schematic drawing of a substrate protection device in accordance with another aspect of the present disclosure.
Figure 4:
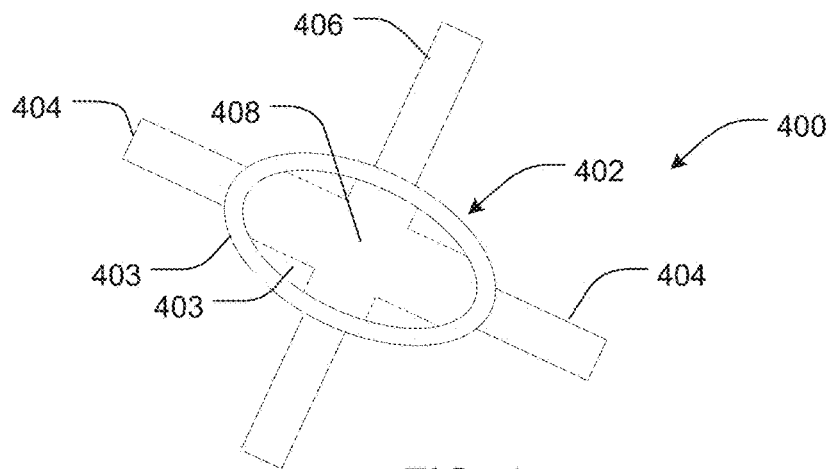
FIG. 4 is a schematic drawing of a substrate protection device in accordance with another aspect of the present disclosure.
Figure 5:
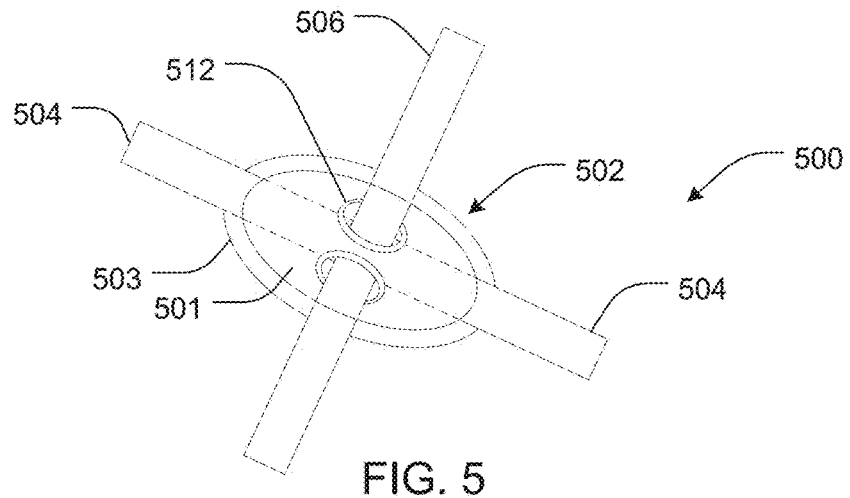
FIG. 5 is a schematic drawing of a substrate protection device in accordance with another aspect of the present disclosure.

FIGS. 3, 4, and 5, show exemplary substrate protection devices having multiple layers for the protective substrate. In one example, as shown in FIG. 3, a substrate protection device 300 can include a protective substrate 302, a first securing mechanism 304, and the second securing mechanism 306. The protective substrate can include multiple layers, such as, for example, a first layer 301 and a second layer 303. In some examples, one or more of the first or second securing mechanisms 304, 306 can be positioned partially between the first layer 301 and the second layer 303. In one example, the layers can be attached or otherwise sewn together to form the protective substrate 302. In the case of FIG. 3, the second layer 303 is folded over a portion of the edge of the first layer 301 and secured in place.

FIG. 4 shows another example of a substrate protection device 400, including a protective substrate 402, a first securing mechanism 404, a second securing mechanism 406, and securing mechanism channels 408 in the protective substrate 402. The protective substrate 402 can include a first layer (not shown) and a second layer 403 attached to the first layer. The securing mechanism channels 408 allow the first and second securing mechanisms to pass therethrough.

In another example, as shown in FIG. 5, a substrate protection device 500 can include a protective substrate 502, a first securing mechanism 504, and a second securing mechanism 506. The protective substrate 502 can include a first layer 501 and a second layer 503, which can be sewn or otherwise attached to one another to form the protective substrate 502. In this example, the first securing mechanism extends outwardly from between the first layer 501 and the second layer 503, and the second securing mechanism passes through holes 512 in the protective substrate 502, which in this example is through the first layer 501. In another example, both securing mechanisms can pass through holes positioned in both the first layer 501 and the second layer 503. In some cases, the holes 512 can include an edging, such as embroidery, rings, or the like, along the hole edges.

In one example, the protective substrate can include a material positioned adjacent to the rail-type structure to increase the friction therebetween in a non-damaging manner. Non-limiting examples can include natural or synthetic rubbers, polymeric compounds, tackifying agents, and the like. In a further embodiment, the protective substrate can comprise decorative embellishments, such as, for example, surface designs, beading, sequins, ribbons, fringes, glitter, bells, flowers, bows, and the like, including combinations thereof.

The shape of the protective substrate can be variable, depending on the device design. Non-limiting examples can include shapes that are circular, oval, rectangular, square, diamond, polygonal, or the like, including combinations thereof. In some examples the protective substrate can include a central shape with flaps operable to wrap around the rail-type structure.

The securing mechanisms can include numerous designs and materials, and are contemplated to include any material or design that allows coupling of the protective substrate and securing to a supporting structure or a decorative device. The first securing mechanism and the second securing mechanism can be the same or different materials from one another, and can be the same or different mechanism design from one another.

The first securing mechanism and the second securing mechanism can independently include a variety of securing mechanisms, non-limiting examples of which include a pair of ties, single tie, string, cord, wire, strap, ribbon, hook and loop fastener, frog clasp, wraparound, elastic with a securing mechanism, button and loop, button and button hole, hook and eye, clip, clasp, latch, strap, snap, buckle, zipper, clamps, cloth extensions, and the like, including combinations thereof. In one example, at least one of the first or second securing mechanism can include a pair of ties. In another example, at least one of the first or second securing mechanism can include a button and button hole. In yet another example, at least one of the first or second securing mechanism can include a zipper. In a further example, at least one of the first or second securing mechanism can include a button and loop. In a further example, at least one of the first or second securing mechanism can include a pair of hook and eyes. In still another example, at least one of the first or second securing mechanism can include a snap. In a further example, at least one of the first or second securing mechanism can include a cord with an embedded wire.

Figure 6:
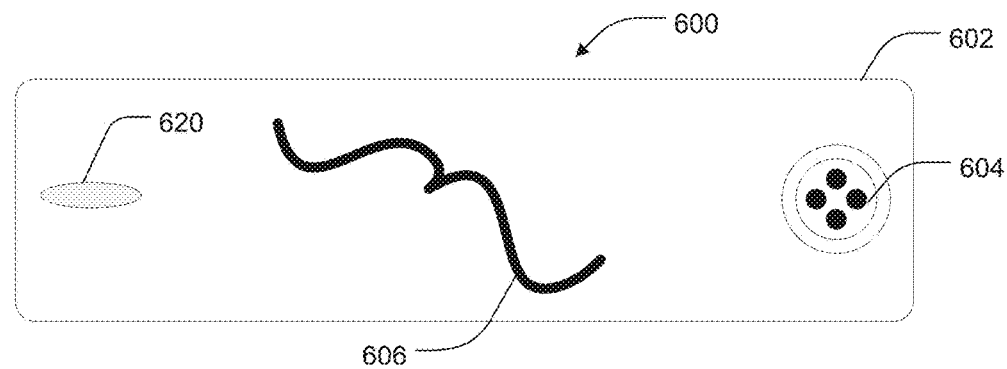
FIG. 6 is a schematic drawing of a substrate protection device in accordance with another aspect of the present disclosure.
Figure 7:
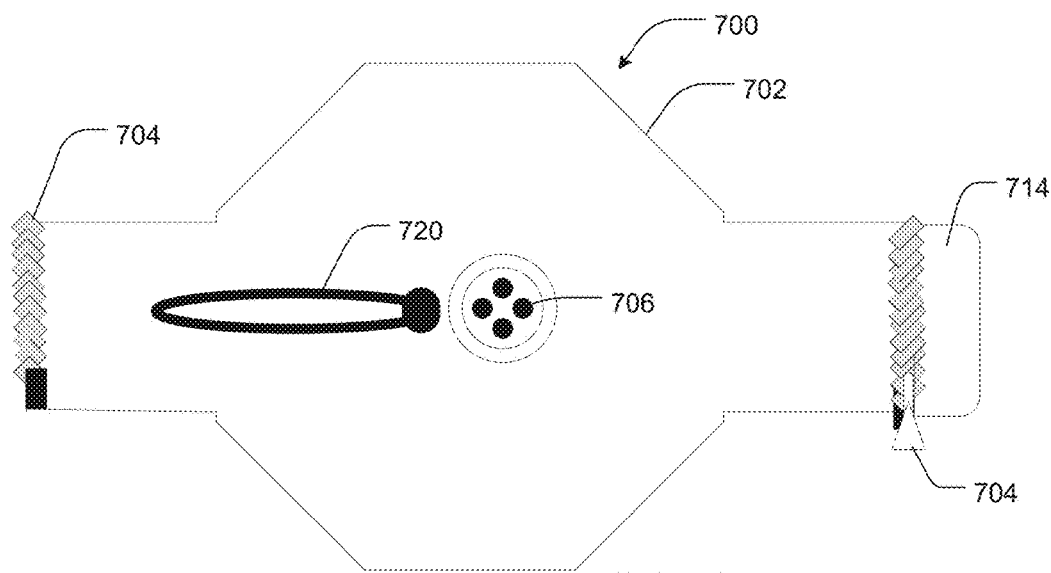
FIG. 7 is a schematic drawing of a substrate protection device in accordance with another aspect of the present disclosure.

In one example, as shown in FIG. 6, a substrate protection device 600 can include a protective substrate 602 having a rectangular shape, a first securing mechanism including a button 604 and button hole 620, and a second securing mechanism 606 including a pair of ties, such as cords. In another example, as shown in FIG. 7, a substrate protection device 700, can include a protective substrate 702 having a polygonal shape, a first securing mechanism 704 including two halves of a zipper, a second securing mechanism including a button 706 and button loop 720, and a protective flap 714. The protective flap can prevent or minimize potential damage from the zipper to the rail-type structure. It is noted that such a protective flap or extension can be utilized with other substrate protective device designs to provide protection from securing devices and other potentially damaging elements.

Figure 8:
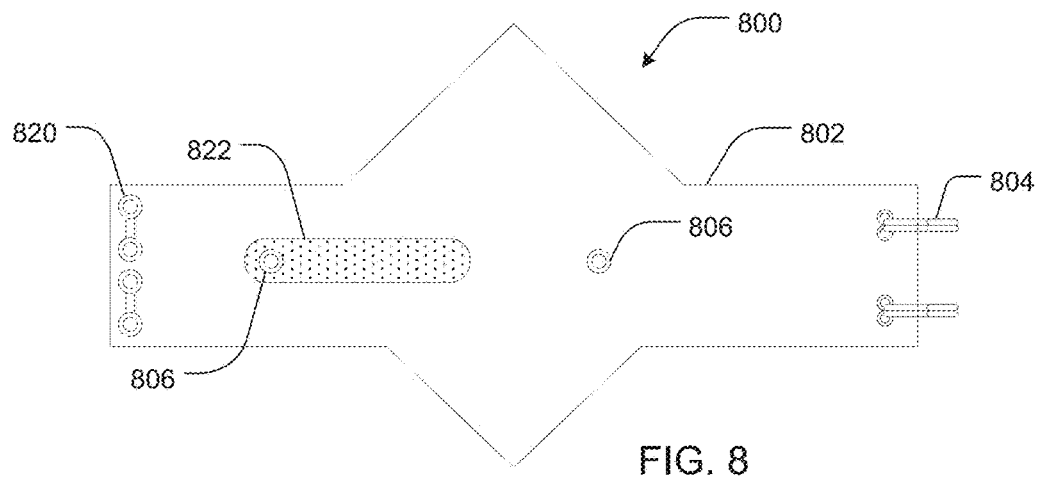
FIG. 8 is a schematic drawing of a substrate protection device in accordance with another aspect of the present disclosure.
Figure 9:
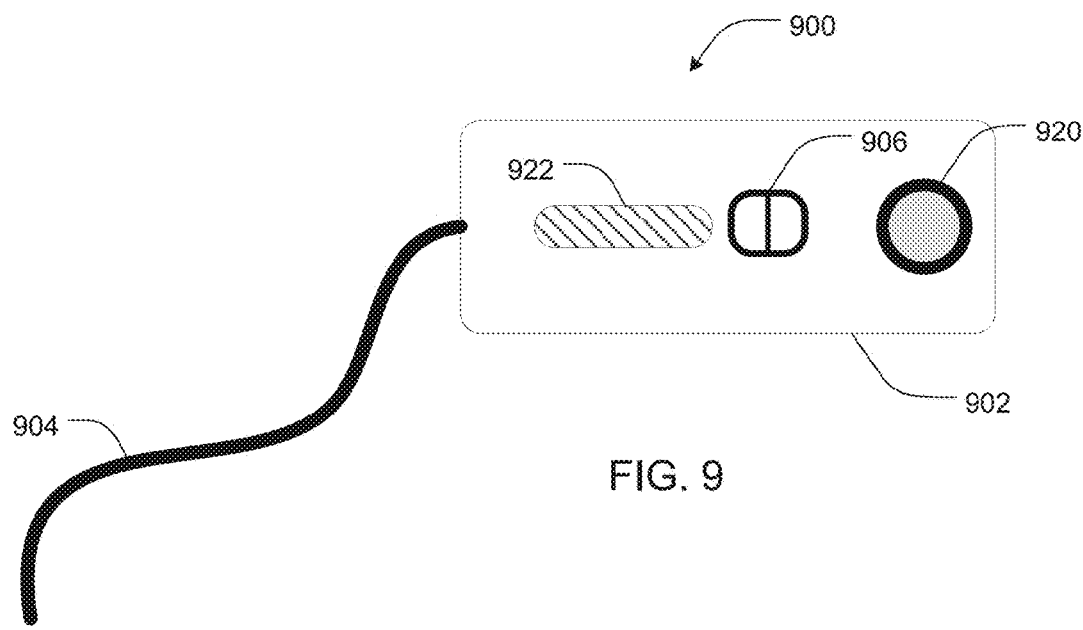
FIG. 9 is a schematic drawing of a substrate protection device in accordance with another aspect of the present disclosure.

In yet another example as shown in FIG. 8, a substrate protection device 800 can include a protective substrate 802 having a polygonal shape, a first securing mechanism including a hook 804 and eye 820, and a second securing mechanism including a snap 806 with one end of the snap attached to a fabric strap 822. In another example, as shown in FIG. 9, a substrate protection device 900 can include a protective substrate 902, a first securing mechanism including a string, cord, rope, etc. 904 and a popper-type button 920, and a second securing mechanism including a buckle 906 and a ribbon 922.

The various securing mechanisms can be coupled to the protective substrate in a variety of ways. In some cases, the first and second securing mechanisms can be coupled at essentially a common location as is shown in FIG. 2 and for the second securing mechanism in FIGS. 5 & 6. In some cases, the first and second securing mechanisms can extend through layers of a protective substrate as shown in FIGS. 3-5. In other cases, one or more of the first and second securing mechanisms can be coupled to the protective substrate along an extended region, as is shown in FIGS. 6, 7, 8, 9, and 10 for the first securing mechanism. In some cases, one or more the first and second securing mechanisms can be located on an interior region of the protective substrate as shown in FIG. 1 for the first securing mechanism and for the second securing mechanism in FIGS. 6, 7, 8, 9, and 10.

In some examples the second securing mechanism can include an extended portion between two parts of second securing mechanism along the protective substrate. The extended portion can be a separate structure from the second securing mechanism, or the extended portion can be a continuous portion of the second securing mechanism that is attached to the protective substrate. Additionally, the coupling point or points between the second securing mechanism and the protective substrate, or the points where the second securing mechanism extend away from the protective substrate, can be located at any location along the protective substrate, and can be symmetrical or asymmetrical from one another (for multiple points) or from the coupling point of the first securing mechanism. Additionally, the same design variability can apply to the first securing mechanism. Various combinations of securing mechanism arrangements are contemplated, and such combinations are considered to be within the present scope. Such combinations additionally include securing mechanisms on the same side, opposites sides, coupled to external surfaces, coupled inside of the protective substrate, and the like.

In some examples, the substrate protection device can further include a substrate protection fastener. The substrate protection fastener can allow for multiple substrate protection devices to be coupled to one another. The substrate protection fastener can be useful with a decorative design where the decorative item is tightly attached or wound to the rail-type substrate. The substrate protection fastener can include any of the types of fasteners previously discussed. In some embodiments, the substrate protection fastener can be a two-part fastener located at opposite regions of the protective substrate.

In yet another example, the substrate protection device can further comprise a protective substrate expander. The protective substrate expander can allow for area of the protective substrate to be expanded. The protective substrate expander can include any of the materials, layers, properties, and decorative embellishments, previously identified for the protective substrate. In one example, the protective substrate expander can be designed to attach to the substrate protection device using a fastener that complements the fastener of the first securing mechanism.

Figure 10:
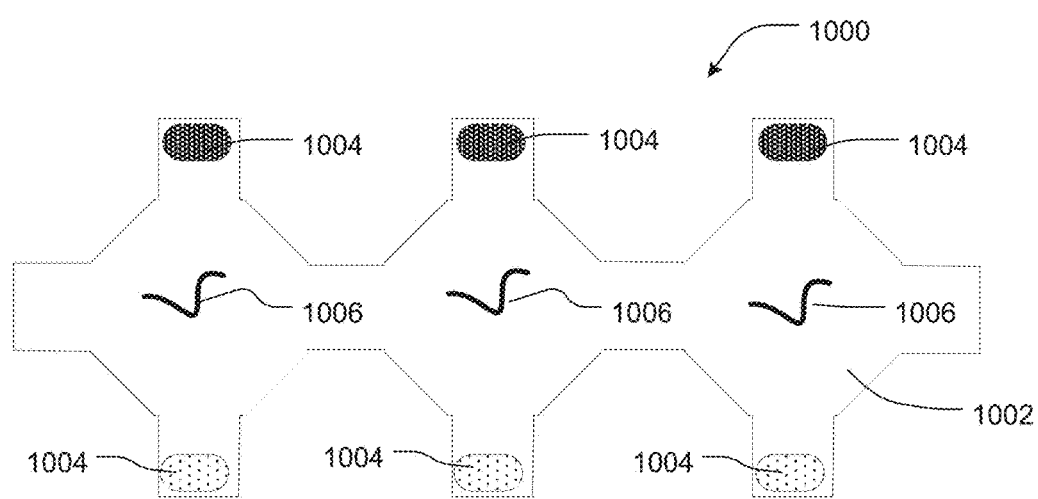
FIG. 10 is a schematic drawing of a substrate protection device in accordance with another aspect of the present disclosure.

In yet another example, the substrate protection device can include multiple first and second securing mechanisms along multiple portions of the protective substrate. This example can be particularly useful when the substrate protection device is used with a tightly wound decorative item or when the substrate protection device has a desirable decorative design and becomes a decoration. One such example is shown in FIG. 10, where the substrate protection device 1000 includes a protective substrate 1002, a first securing mechanism 1004 including a hook and loop fastener, and a second securing mechanism 1006, including a cord with embedded wire. Various other designs for multiple coupled substrate protection devices are contemplated that include multiple first and second securing mechanism along multiple portions of the protective substrate, and can include any of the various shapes, materials, or fasteners previously presented herein.

In a further example, a method of protecting a rail-type structure from an attached decorative item is provided. The method can include securing a substrate protection device comprising a protective substrate and a first and a second securing mechanism to the rail-type structure using the first securing mechanism, and securing the decorative item to the substrate protection device using the second securing mechanism, wherein the protective substrate reduces or eliminates contact between the rail-type structure and the decorative item to minimize damage.

Figure 11:
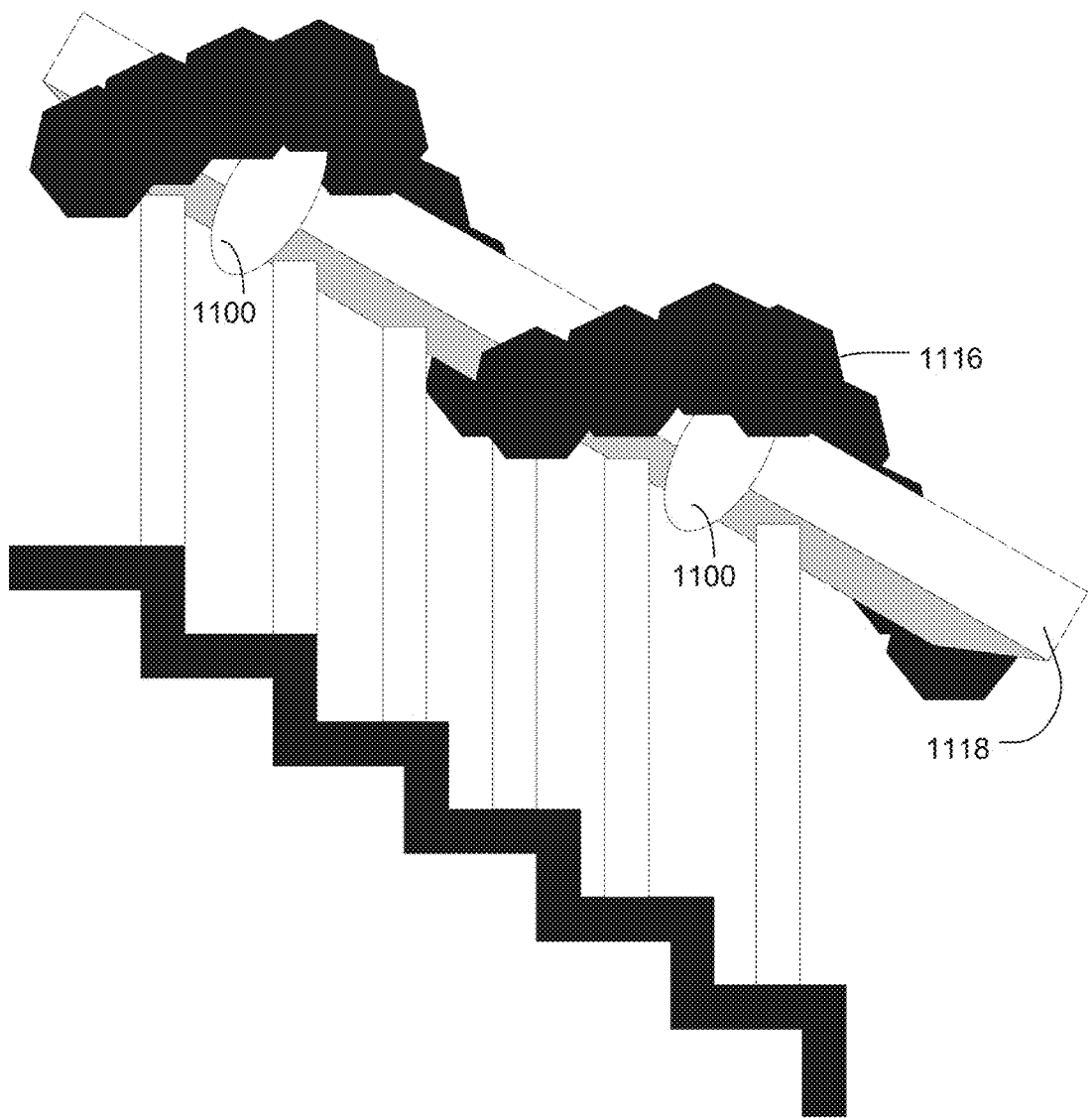
FIG. 11 is a schematic drawing of a substrate protection device in use with a decorative item on a rail type structure in accordance with another aspect of the present disclosure.

In one example, multiple substrate protection devices can be coupled to the rail-type structure, and a linear decorative item, such as a garland or string of lights, can be positioned along the rail-type structure and coupled thereto by the second securing mechanism. Such is shown in FIG. 11, for example, whereby a linear decorative item 1116 is coupled to a rail-type structure 1118 by multiple substrate protection devices 1100.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been described above with particularity and detail in connection with what is presently deemed to be the most practical embodiments of the disclosure, it will be apparent to those of ordinary skill in the art that numerous modifications, including, but not limited to, variations in size, materials, shape, form, function and manner of operation, assembly and use may be made without departing from the principles and concepts set forth herein.

What is claimed:

1. A substrate protection device for attaching a decorative item to a rail-type structure, comprising:
   a protective substrate conformable to a rail-type structure, the protective substrate comprising at least three layers of material including a top layer, a bottom layer, and an intermediate layer, wherein the intermediate layer comprises member selected from the group consisting of a padding layer, a fire-retardant layer, a scented layer, a water proofing layer, and combinations thereof;
   a first securing mechanism coupled to the protective substrate and structurally configured to attach the protective substrate to the rail-type structure, the first securing mechanism comprising a pair of ties; and a second securing mechanism coupled to the protective substrate and structurally configured to attach the decorative item to the protective substrate.

2. The device of claim 1, wherein the protective substrate comprises a material selected from the group consisting of fabric, cloth, leather, fur, felt, ribbon, batting, foam, rubber, plastic, vinyl, canvas, cardboard, carpet, paper, ceramic, polymeric materials, rope, metal, and combinations thereof.

3. The device of claim 1, wherein the protective substrate comprises decorative embellishments.

4. The device of claim 1, wherein the first securing mechanism and the second securing mechanism are coupled to the protective substrate on opposite sides of the protective substrate.

5. The device of claim 1, wherein the pair of ties includes string, cord, wire, ribbon, and combinations thereof.

6. The device of claim 1, wherein the second securing mechanism includes a member selected from the group consisting of a pair of ties, single tie, string, cord, wire, strap, ribbon, hook and loop fastener, frog clasp, wraparound, elastic with a securing mechanism, button and loop, button and button hole, hook and eye, clip, clasp, latch, strap, snap, buckle, zipper, clamps, cloth extensions, and combinations thereof.

7. The device of claim 1, wherein at least one of the first securing mechanism or the second securing mechanism comprise a cord having an embedded wire.

8. A method of protecting a rail-type structure from an attached decorative item, comprising:

securing a substrate protection device comprising a protective substrate and a first and second securing mechanisms to the rail-type structure using the first securing mechanism comprising a pair of ties; and securing the decorative item to the substrate protection device using the second securing mechanism, wherein the protective substrate reduces or eliminates contact between the rail-type structure and the decorative item to minimize damage, wherein the protective substrate comprising at least three layers of material including a top layer, a bottom layer, and an intermediate layer, and wherein the intermediate layer comprises member selected from the group consisting of a padding layer, a fire-retardant layer, a scented layer, a water proofing layer, and combinations thereof.

9. The method of claim 8, further comprising securing multiple substrate protection devices to the rail-type structure.

* * * * *